US012763715B2

(12) United States Patent
Tsukagoshi et al.

(10) Patent No.: US 12,763,715 B2
(45) Date of Patent: Oct. 13, 2026

(54) MOTOR CONTROL DEVICE AND MOTOR CONTROL METHOD

(71) Applicant: Hitachi Astemo, Ltd., Hitachinaka (JP)

(72) Inventors: Takaya Tsukagoshi, Hitachinaka (JP); Takafumi Hara, Tokyo (JP); Shigehisa Aoyagi, Hitachinaka (JP); Shogo Miyamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 196 days.

(21) Appl. No.: 18/846,223

(22) PCT Filed: Mar. 17, 2022

(86) PCT No.: PCT/JP2022/012255

§ 371 (c)(1),
(2) Date: Sep. 11, 2024

(87) PCT Pub. No.: WO2023/175832

PCT Pub. Date: Sep. 21, 2023

(65) Prior Publication Data

US 2025/0192713 A1 Jun. 12, 2025

(51) Int. Cl.
*B60L 50/51* (2019.01)
*H02P 23/00* (2016.01)
(Continued)

(52) U.S. Cl.
CPC ........ *H02P 27/085* (2013.01); *H02P 23/0027* (2013.01); *H02P 23/04* (2013.01); *H02P 25/03* (2016.02); *H02P 2209/13* (2013.01)

(58) Field of Classification Search
CPC .... H02P 27/085; H02P 25/03; H02P 23/0027; H02P 2209/13; B60L 50/51
See application file for complete search history.

(56) References Cited

U.S. PATENT DOCUMENTS

2010/0052583 A1* 3/2010 Takamatsu .............. B60L 50/51 318/400.09
2016/0308475 A1* 10/2016 Morii .................... H02P 27/085

FOREIGN PATENT DOCUMENTS

JP 2018-099003 A 6/2018

OTHER PUBLICATIONS

International Search Report Issued in PCT Application No. PCT/JP2022/012255 dated May 17, 2022, with English Translation.

* cited by examiner

*Primary Examiner* — Cortez M Cook
(74) *Attorney, Agent, or Firm* — Foley & Lardner LLP

(57) ABSTRACT

Provided is a motor control device capable of appropriately achieving both low loss and low NV in a scene where a plurality of surrounding environments and a plurality of vehicle states overlap. The motor control device is connected to an AC motor and PWM-controls a power converter that performs power conversion from DC power to AC power. The motor control device includes: a plurality of PWM pulse patterns; a pulse pattern determination unit that sets a pulse pattern for performing the PWM control; an evaluation unit that determines a priority of a total loss of the AC motor and the power converter and vibration noise of the AC motor; and a loss/NV calculation unit that calculates a value of the total loss and a value of the vibration noise in torque and rotation speed for each pulse pattern. The evaluation unit determines the priority on the basis of a parameter regarding at least one of a surrounding environment, mode designation by intention of a driver, a remaining battery amount, a driving operation point, and a vehicle state, and the pulse pattern determination unit sets the pulse pattern by using the priority determined by the evaluation unit, the value of the total loss, and the vibration noise.

14 Claims, 10 Drawing Sheets

(51) Int. Cl.

| | |
|---|---|
| ***H02P 23/04*** | (2006.01) |
| ***H02P 25/03*** | (2016.01) |
| ***H02P 27/08*** | (2006.01) |

MOTOR CONTROL DEVICE AND MOTOR CONTROL METHOD

TECHNICAL FIELD

The present invention relates to a configuration of a motor control device that controls driving of a motor and a control method thereof, and more particularly to a technique that is effective when applied to an in-vehicle motor in which a load changes according to a surrounding environment and a vehicle state.

BACKGROUND ART

An in-vehicle motor mounted on a hybrid electric vehicle (HEV) or an electric vehicle (EV) is required to have performance with low loss and high efficiency. In addition, one of important values provided is quietness, which is not found in the engine vehicle, and there is also a strong demand for low noise vibration (NV). In recent years, the spread of HEV and EV has rapidly progressed, and the demand for low loss and low NV has further increased with the improvement of driving quality and the introduction of automatic driving.

An in-vehicle motor is generally driven and controlled by pulse width modulation (PWM) control. However, since loss and NV in the PWM control are in a certain trade-off relationship, control for switching a pulse pattern according to a threshold designed in advance is performed.

As a background art of the present technical field, for example, there is a technique such as PTL 1. PTL 1 discloses "an electric motor control device including a control device 60 including a carrier frequency control unit 77 that can weight according to surrounding environment of a vehicle, a use state (for example, a traveling state), or the like". (paragraphs and of PTL 1)

CITATION LIST

Patent Literature

PTL 1: JP 2018-99003 A

SUMMARY OF INVENTION

Technical Problem

However, since the load of an in-vehicle motor mounted on an automobile constantly changes according to the surrounding environment and the vehicle state during traveling, there is a possibility that it is not possible to select an appropriate PWM that achieves both low loss and low NV in a scene where a plurality of surrounding environments and a plurality of vehicle states overlap.

In PTL 1 described above, the weighting of low loss and low NV is determined in specific surrounding environment and vehicle state such as nighttime or a case where the outside temperature is high and the traveling state of the vehicle is low speed, and there is a possibility that appropriate PWM cannot be selected in a scene in which a plurality of these conditions overlap. In addition, when a carrier frequency is changed, in a case where a frequency variation is large, there is a possibility that the auditory perception of the driver deteriorates.

In this regard, an object of the present invention is to provide a motor control device and a motor control method capable of appropriately achieving both low loss and low NV in a scene where a plurality of surrounding environments and a plurality of vehicle states overlap.

Solution to Problem

In order to solve the above problems, the present invention is a motor control device which is connected to an AC motor and PWM-controls a power converter that performs power conversion from DC power to AC power. The motor control device includes: a plurality of PWM pulse patterns; a pulse pattern determination unit that sets a pulse pattern for performing the PWM control; an evaluation unit that determines a priority of a total loss of the AC motor and the power converter and vibration noise of the AC motor; and a loss/NV calculation unit that calculates a value of the total loss and a value of the vibration noise in torque and rotation speed for each pulse pattern. The evaluation unit determines the priority on the basis of a parameter regarding at least one of a surrounding environment, mode designation by intention of a driver, a remaining battery amount, a driving operation point, and a vehicle state, and the pulse pattern determination unit sets the pulse pattern by using the priority determined by the evaluation unit, the value of the total loss, and the vibration noise.

In addition, the present invention is a motor control method for PWM-controlling an AC motor. The motor control method includes: (a) a step of determining a priority of a total loss of the AC motor and a power converter that drives the AC motor, and vibration noise of the AC motor; (b) a step of determining the priority on the basis of a parameter regarding at least one of a surrounding environment, mode designation by intention of a driver, a remaining battery amount, a driving operation point, and a vehicle state; and (c) a step of setting a pulse pattern by using the priority determined in the step (b), a value of the total loss, and the vibration noise.

Advantageous Effects of Invention

According to the present invention, it is possible to achieve a motor control device and a motor control method capable of appropriately achieving both low loss and low NV in a scene where a plurality of surrounding environments and a plurality of vehicle states overlap.

Problems, configurations, and effects other than those described above will be clarified by the following description of embodiments.

DESCRIPTION OF EMBODIMENTS

Figure 1:
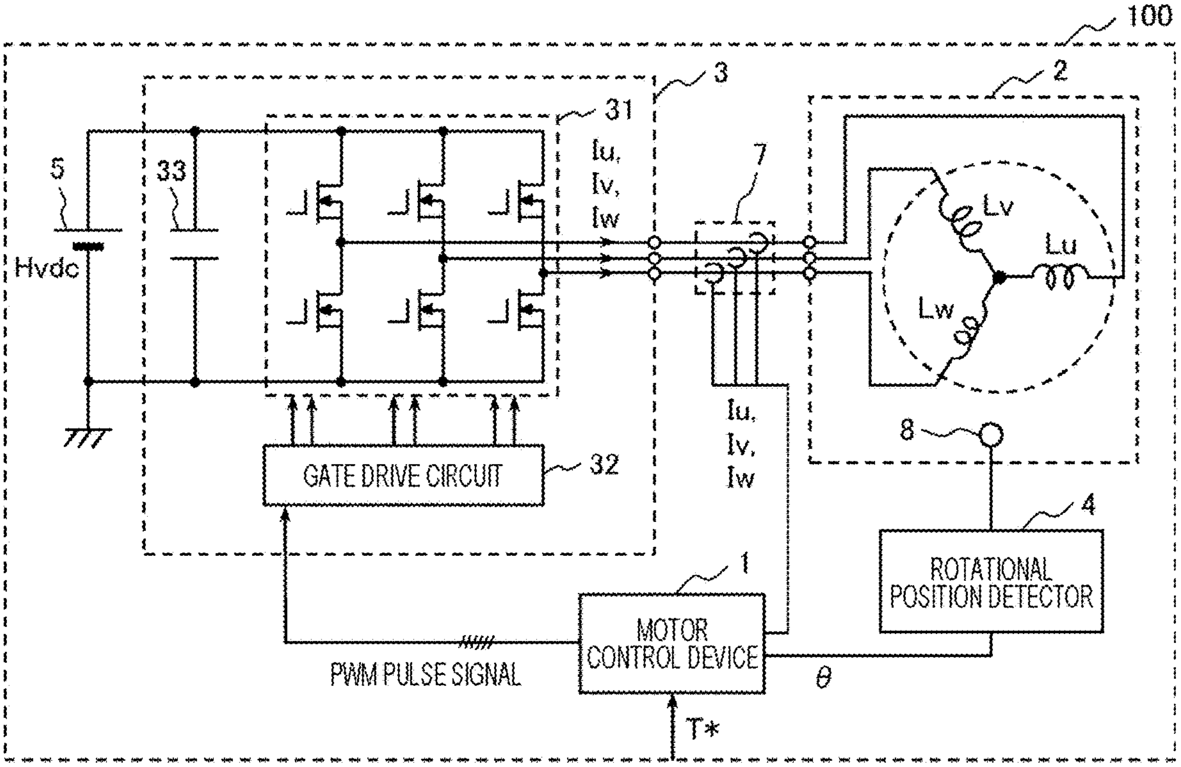
FIG. 1 is a diagram illustrating a schematic configuration of a motor drive system according to a first embodiment of the present invention.

Hereinafter, embodiments of the present invention will be described with reference to the drawings. Note that in the drawings, the same components are denoted by the same reference numerals, and the detailed description of overlapping components is omitted.

First Embodiment

A motor drive system according to a first embodiment of the present invention will be described with reference to FIGS. 1 to 8.

FIG. 1 is a diagram illustrating a schematic configuration of the motor drive system according to the present embodiment.

As illustrated in FIG. 1, a motor drive system 100 of the present embodiment includes, as main components, a motor control device 1, a permanent magnet synchronous motor 2, an inverter 3, a rotational position detector 4, a high-voltage battery 5, a current detection unit 7, and a rotational position sensor 8.

The inverter 3 includes a DC/AC conversion circuit 31, a gate drive circuit 32, and a capacitor 33 which is a smoothing capacitor.

The permanent magnet synchronous motor 2 is a three-phase AC motor having three coils Lu, Lv, and Lw.

The rotational position detector 4 outputs, to the motor control device 1, a rotational position 0 of the permanent magnet synchronous motor 2 detected by the rotational position sensor 8.

The motor control device 1 generates a pulse width modulation (PWM) pulse signal on the basis of an input torque command T*, the three-phase current values Iu, Iv, and Iw detected by the current detection unit 7, and the rotational position θ of the permanent magnet synchronous motor 2 input from the rotational position detector 4, and outputs the PWM pulse signal to the gate drive circuit 32 of the inverter 3.

The DC/AC conversion circuit 31 is configured by connecting three arms in parallel, each arm having two switching elements connected in series, converts DC power output from the high-voltage battery 5 into three-phase AC power, and outputs the three-phase AC power to the permanent magnet synchronous motor 2. The three-phase current values Iu, Iv, and Iw flow from the DC/AC conversion circuit 31 to the permanent magnet synchronous motor 2.

The gate drive circuit 32 controls ON/OFF of the gates of a total of six switching elements of the DC/AC conversion circuit 31 on the basis of the PWM pulse signal generated by the motor control device 1.

Figure 2:
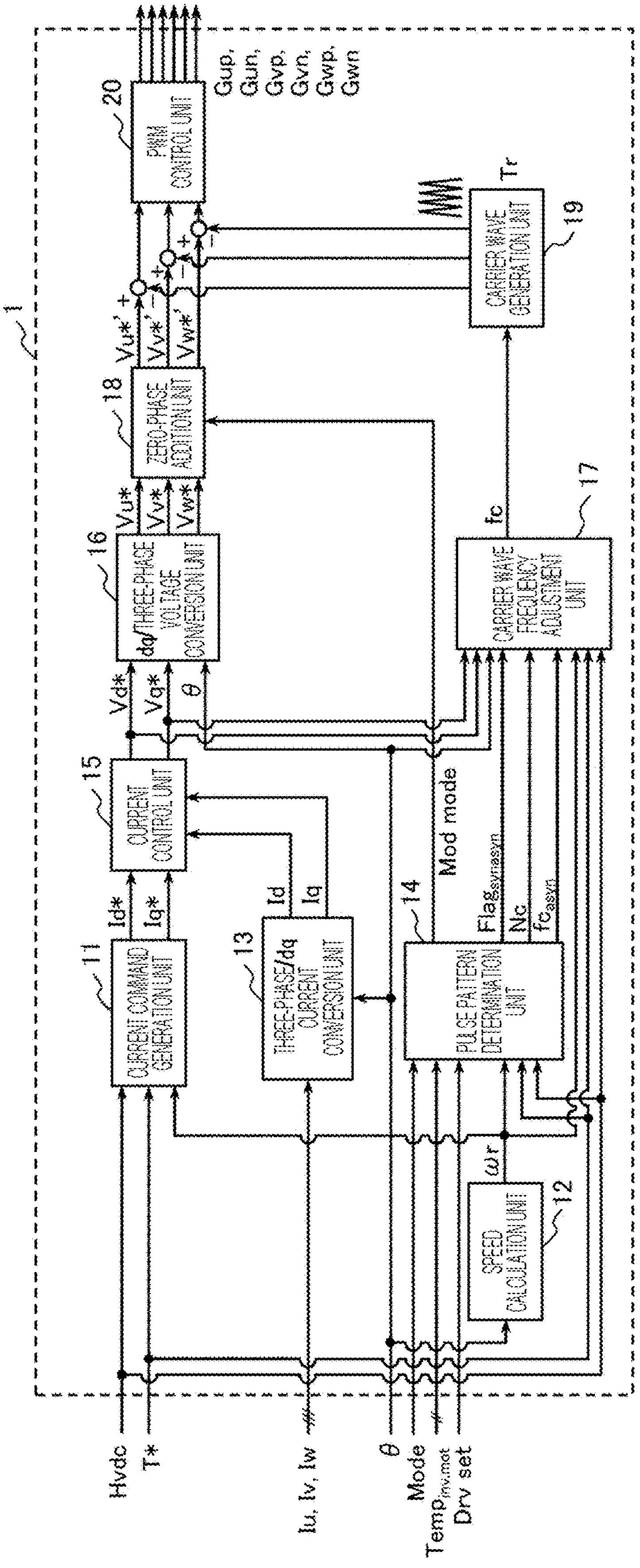
FIG. 2 is a functional block diagram of a motor control device 1 of FIG. 1.

The configuration of the motor control device 1 will be described with reference to FIG. 2. FIG. 2 is a functional block diagram of the motor control device 1 of FIG. 1.

As illustrated in FIG. 2, the motor control device 1 includes a current command generation unit 11, a speed calculation unit 12, a three-phase/dq current conversion unit 13, a pulse pattern determination unit 14, a current control unit 15, a dq/three-phase voltage conversion unit 16, a carrier wave frequency adjustment unit 17, a zero-phase addition unit 18, a carrier wave generation unit 19, and a PWM control unit 20.

The current command generation unit 11 generates current commands Id* and Iq* on the basis of a power supply voltage Hvdc output from the high-voltage battery 5, the torque command T*, and an angular velocity ωr output from the speed calculation unit 12, and outputs the current commands Id* and Iq* to the current control unit 15.

The speed calculation unit 12 outputs the angular velocity ωr on the basis of the rotational position θ of the permanent magnet synchronous motor 2.

The three-phase/dq current conversion unit 13 converts the three-phase current values Iu, Iv, and Iw detected by the current detection unit 7 into a d-axis current Id and a q-axis current Iq, and outputs the d-axis current Id and the q-axis current Iq to the current control unit 15.

The pulse pattern determination unit 14 determines a pulse pattern for PWM control on the basis of the power supply voltage Hvdc, the torque command T*, the angular velocity ωr, and the respective input signals of Mode, inverter/motor temperatures $Temp_{inv,mot}$, and Drv set, and outputs the pulse pattern to the carrier wave frequency adjustment unit 17 and the zero-phase addition unit 18.

A Mod mode signal is input from the pulse pattern determination unit 14 to the zero-phase addition unit 18, and the respective signals of $Flag_{synasyn}$, Nc, and $fc_{asyn}$ are input from the pulse pattern determination unit 14 to the carrier wave frequency adjustment unit 17.

The current control unit 15 outputs dq-axis voltage commands Vd* and Vq* to the dq/three-phase voltage conversion unit 16 and the carrier wave frequency adjustment unit 17 on the basis of the current commands Id* and Iq*, and the d-axis current Id and the q-axis current Iq.

The dq/three-phase voltage conversion unit 16 outputs three-phase voltage commands Vu*, Vv*, and Vw* to the zero-phase addition unit 18 on the basis of the voltage commands Vd* and Vq* and the rotational position 0 of the permanent magnet synchronous motor 2.

The carrier wave frequency adjustment unit 17 adjusts a carrier wave frequency fc on the basis of the dq-axis voltage commands Vd* and Vq*, the rotational position θ of the permanent magnet synchronous motor 2, the respective signals of $Flag_{synasyn}$, Nc, and $fc_{asyn}$, the angular velocity ωr, the power supply voltage Hvdc, and the torque command T*, and outputs the carrier wave frequency fc to the carrier wave generation unit 19.

The zero-phase addition unit 18 adds the Mod mode signal output from the pulse pattern determination unit 14 to the three-phase voltage commands Vu*, Vv*, and Vw*, and outputs three-phase voltage commands Vu*', Vv*', and Vw*'.

The carrier wave generation unit 19 outputs carrier wave Tr on the basis of the carrier wave frequency fc adjusted by the carrier wave frequency adjustment unit 17.

The PWM control unit 20 adds and subtracts the three-phase voltage commands Vu*', Vv*', and Vw*' output from the zero-phase addition unit 18 and the carrier wave Tr output from the carrier wave generation unit 19, and outputs PWM control signals Gup, Gun, Gvp, Gvn, Gwp, and Gwn.

The motor control device 1 of the present embodiment is configured as described above, and the pulse pattern determination unit 14 determines an optimum pulse pattern capable of performing appropriate PWM control that achieves both low loss and low NV even in a scene where a plurality of surrounding environments and a plurality of vehicle states overlap.

Note that the determination of the optimum pulse pattern in the optimum pulse pattern determination unit 143 in the pulse pattern determination unit 14 to be described later with reference to FIG. 3 may be performed by directly operating the gate signal of the switching element of the DC/AC conversion circuit 31 in the PWM control unit 20 without using the carrier wave frequency adjustment unit 17, the zero-phase addition unit 18, and the carrier wave generation unit 19.

The configuration of the pulse pattern determination unit 14 will be described with reference to FIG. 3. FIG. 3 is a functional block diagram of the pulse pattern determination unit 14 in FIG. 2.

Figure 3:
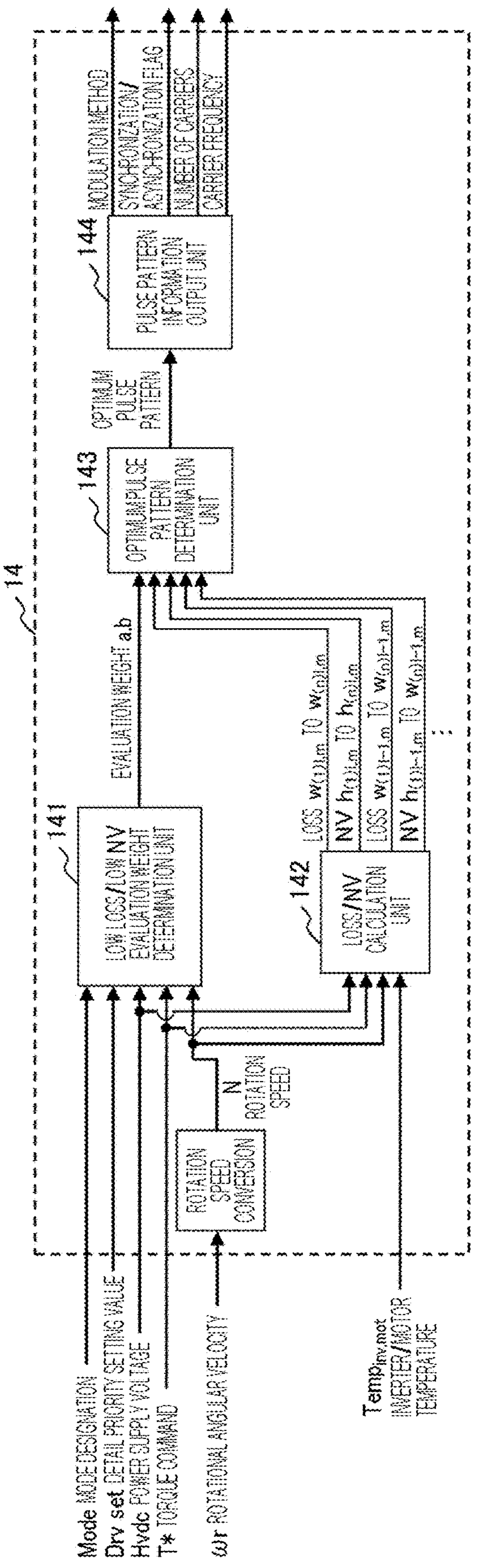
FIG. 3 is a functional block diagram of a pulse pattern determination unit 14 in FIG. 2.

As illustrated in FIG. 3, the pulse pattern determination unit 14 includes a low loss/low NV evaluation weight determination unit 141, a loss/NV calculation unit 142, the optimum pulse pattern determination unit 143, and a pulse pattern information output unit 144.

The configuration of each unit of the low loss/low NV evaluation weight determination unit 141, the loss/NV calculation unit 142, and the optimum pulse pattern determination unit 143 will be described later with reference to FIGS. 4 to 8.

The pulse pattern information output unit 144 receives the optimum pulse pattern output from the optimum pulse pattern determination unit 143 as an input, and outputs the pulse pattern as a modulation method, a synchronization/asynchronization flag, the number of carriers, and a carrier frequency. In a case where the synchronization flag is on, the number of carriers is output, and in a case where the asynchronization flag is on, the carrier frequency is output.

Figure 4:
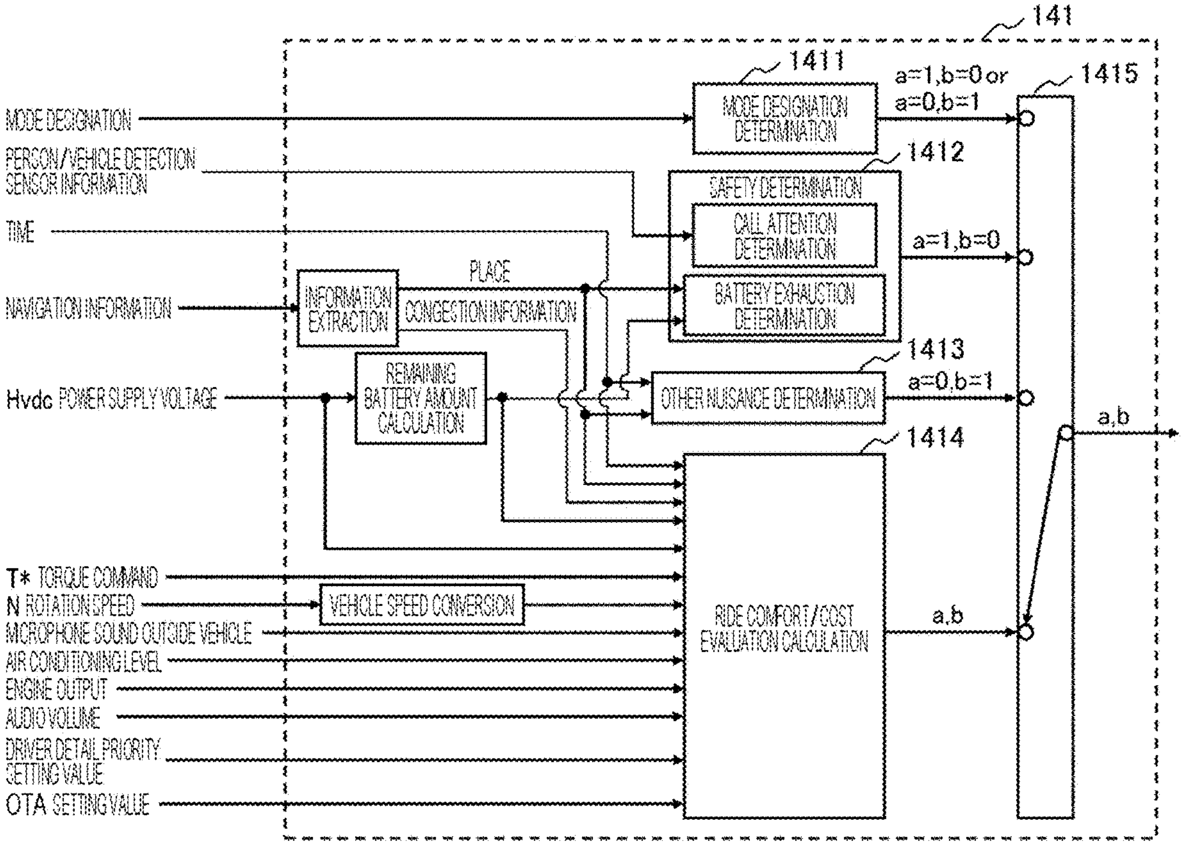
FIG. 4 is a functional block diagram of a low loss/low NV evaluation weight determination unit 141 in FIG. 3.

The configuration of the low loss/low NV evaluation weight determination unit 141 will be described with reference to FIG. 4. FIG. 4 is a functional block diagram of the low loss/low NV evaluation weight determination unit 141 in FIG. 3.

As illustrated in FIG. 4, the low loss/low NV evaluation weight determination unit 141 receives, as an input, low loss/low NV priority information such as mode designation, person/vehicle detection sensor information, time, navigation information, the power supply voltage Hvdc, the torque command T*, rotation speed N, microphone sound outside the vehicle, air conditioning level, engine output, audio volume, a driver detail priority setting value, and an OTA setting value, and determines evaluation weights a and b.

The evaluation weight a indicates a weight of low loss, the evaluation weight b indicates a weight of low NV, and a sum of a and b is 1. For example, when the weight a of the low loss is maximum, a=1 and b=0.

The evaluation weighting is performed by each of mode designation determination 1411, safety determination 1412, other nuisance determination 1413, and ride comfort/cost evaluation calculation 1414 classified by importance, and is performed by an evaluation weight selection unit 1415 in the priority order of 1411, 1412, 1413, and 1414.

The mode designation determination 1411 is effective in a case where there is an instruction of low loss or low NV from a driver, an automatic driving electronic control unit (ECU), or the like, and for example, the weight becomes a=1 and b=0 in the case of low loss or a=0 and b=1 in the case of low NV.

The safety determination 1412 is effective when in a case where call attention determination is made or a case where battery exhaustion determination is made. In addition, contents related to fail-safe such as protection against high heat of the inverter 3 or the permanent magnet synchronous motor 2 may be included.

The call attention determination is effective, for example, in a case where it is detected that a person is present at a short distance from the person/vehicle detection sensor information, and the presence of a host vehicle is indicated as low loss (high NV) of a=1 and b=0. Examples of the person/vehicle detection sensor here include a laser, a radar, a camera, a beacon, a GPS, and the like.

In addition, in the battery exhaustion determination, for example, the battery exhaustion is determined from the remaining battery amount, and the low loss of a=1 and b=0 is set so as to enable driving to a next chargeable place.

The other nuisance determination 1413 is effective in a case where nuisance to another person is a concern, for example, in a case where another person passes through a residential area at night, and the low NV of a=0 and b=1 is set.

Figure 5:
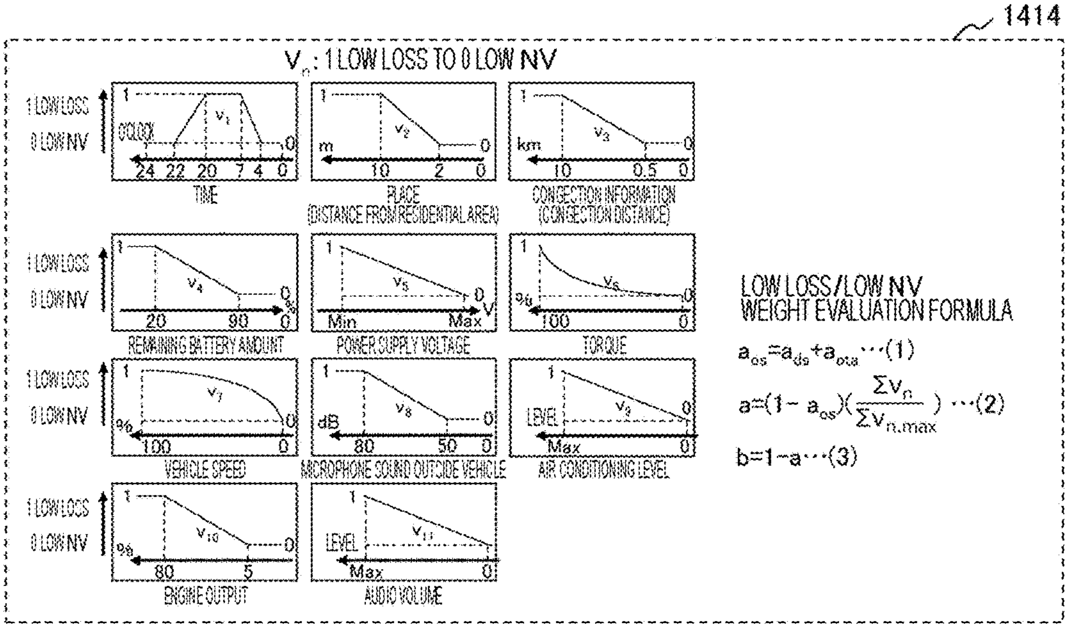
FIG. 5 is a diagram conceptually illustrating processing of ride comfort/cost evaluation calculation 1414 in FIG. 4.

Processing in the ride comfort/cost evaluation calculation 1414 will be described with reference to FIG. 5. FIG. 5 is a diagram conceptually illustrating processing of the ride comfort/cost evaluation calculation 1414 of FIG. 4.

As illustrated in FIG. 5, the ride comfort/cost evaluation calculation 1414 determines ride comfort/cost from a low loss/low NV weight evaluation formula on the basis of low loss/low NV priority information such as surrounding environment/vehicle information.

Examples of the low loss/low NV priority information include time, a place (a distance from a residential area), congestion information (congestion distance), a remaining battery amount, power supply voltage, torque, vehicle speed, microphone sound outside the vehicle, an air conditioning level, engine output, an audio volume, the number of passengers, and a loading amount, and each continuous physical value is converted into an evaluation value Vn to be used in the evaluation formula.

Here, the evaluation value Vn is a value corresponding to the evaluation weight a, and the closer to 1, the closer to the low loss, and the closer to 0, the closer to the low NV.

Note that the evaluation value Vn may not be a perfect continuous value, and may be a discrete value (for example, 10 stages) having a tendency of continuity or the like in consideration of implementation in a program or the like. At this time, a relationship between each surrounding environment/vehicle information and the evaluation value Vn may be prepared in advance at the time of design, or may be updated later by OTA or learning.

The evaluation formula is configured by formulas (1) to (3) in FIG. 5.

Formula (1) is an offset value $a_{os}$ of the weight, and includes, for example, a driver detail priority setting value $a_{ds}$ and an OTA setting value $a_{ota}$. The driver detail priority setting value is an offset value that can be intentionally tuned by the driver, can contribute to further personalization of an automobile, and is set from a setting console of the automobile, a smartphone, or the like. In addition, the OTA setting value $a_{ota}$ enables sharing the performance of the same product affected by aging deterioration, and is set by the OTA function.

Formula (2) is the calculation of the low loss weight a, and is a value obtained by multiplying a value ($1-a_{os}$), which is obtained by subtracting the weight offset value aos from 1, by (ΣVn/ΣVn. max) obtained by balancing low loss and low NV from the surrounding environment/vehicle information. A maximum evaluation value Vn·max in the present embodiment is the maximum value of Vn (1 in the present embodiment).

Formula (3) is the calculation of the low NV weight b, and is a value obtained by subtracting the low loss weight a from 1.

In the present embodiment, although Formula (2) is most simply shown, the value of the maximum evaluation value Vn·max may be changed for each surrounding environment/vehicle information, or a formula with a weight wtn added for each surrounding environment/vehicle information may be used (for example, the second term is (Σ(Vn·wtn)/Σ(Vn·max·wtn)).

In addition, the weight wtn is not a constant value, and may be variable depending on the physical value (each horizontal axis in FIG. 5) of the surrounding environment/vehicle information.

In addition, in the present embodiment, the evaluation formula calculation based on the low loss/low NV priority information such as the surrounding environment/vehicle information is performed for the ride comfort and cost. However, also in the mode designation determination 1411, the safety determination 1412, and the other nuisance determination 1413, the low loss and low NV weight may be determined by the evaluation formula calculation within the same degree of importance.

In addition, in the present embodiment, the ride comfort and cost evaluation assuming a passenger car are described, but emphasis may be placed on the number of occupants and the loading amount for buses and trucks.

Figure 6:
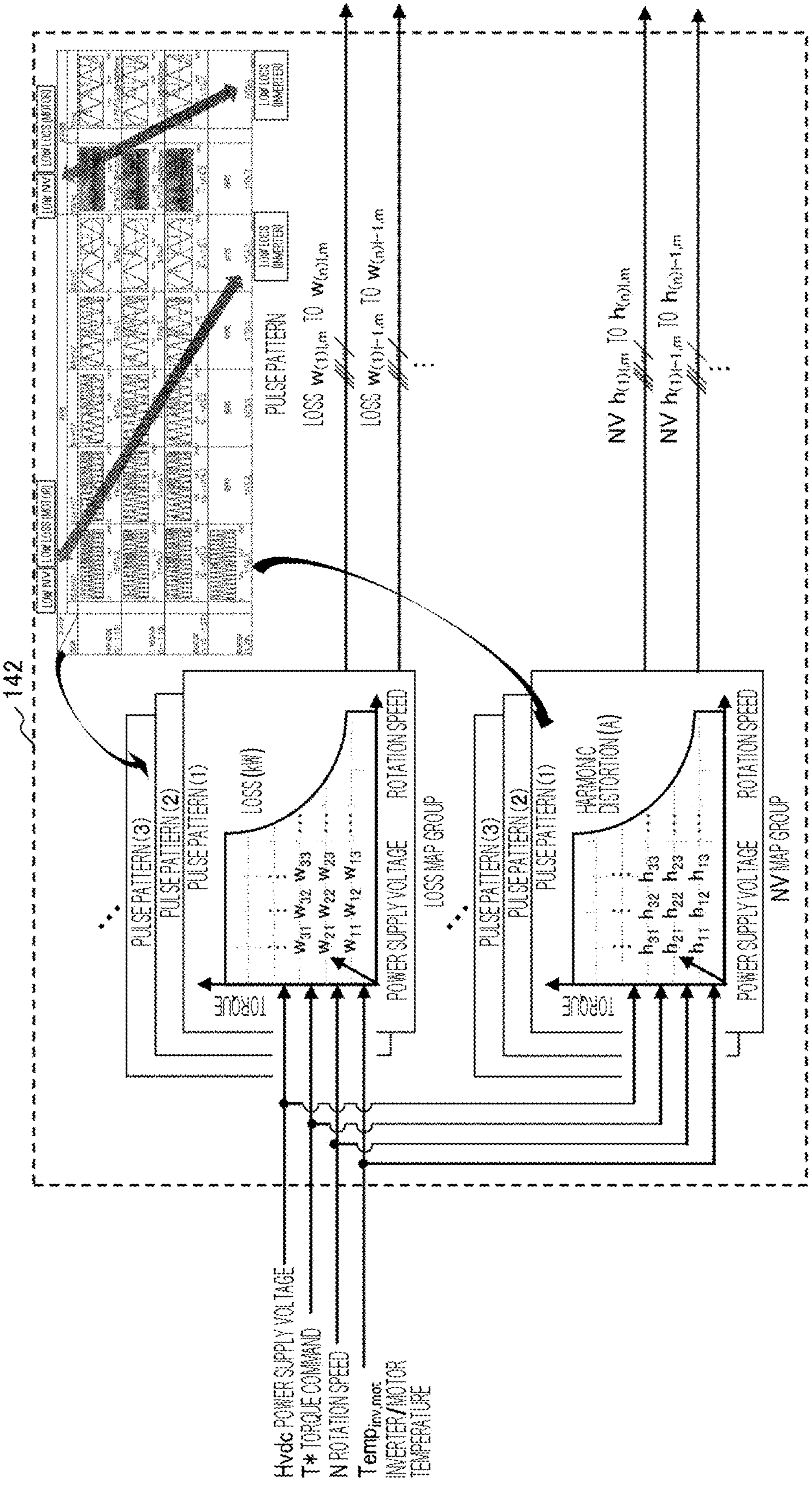
FIG. 6 is a functional block diagram of a loss/NV calculation unit 142 in FIG. 3.

The function of the loss/NV calculation unit 142 will be described with reference to FIG. 6. FIG. 6 is a functional block diagram of the loss/NV calculation unit 142 in FIG. 3.

As illustrated in FIG. 6, the loss/NV calculation unit 142 calculates the loss/NV of the current operating point (1 row and m columns) and the peripheral operating points (for example, 1-1 rows and m columns) for each of the plurality of pulse patterns, on the basis of the power supply voltage Hvdc, the torque command T*, the rotation speed N, and the inverter/motor temperature $Temp_{inv,mot}$. For the loss and NV, values for each operating point are calculated in advance by analysis, and a map is drawn.

Note that the loss refers to a system loss of the inverter/motor, and the NV refers to harmonic distortion of current or torque. In a case where the inverter/motor temperature is different from the value at the time of analysis, the value of loss/NV is corrected.

In the present embodiment, acceleration forward is targeted, but in a case where the loss and NV differ between acceleration and regeneration, and forward and reverse, the loss and NV are calculated for each.

Figure 7:
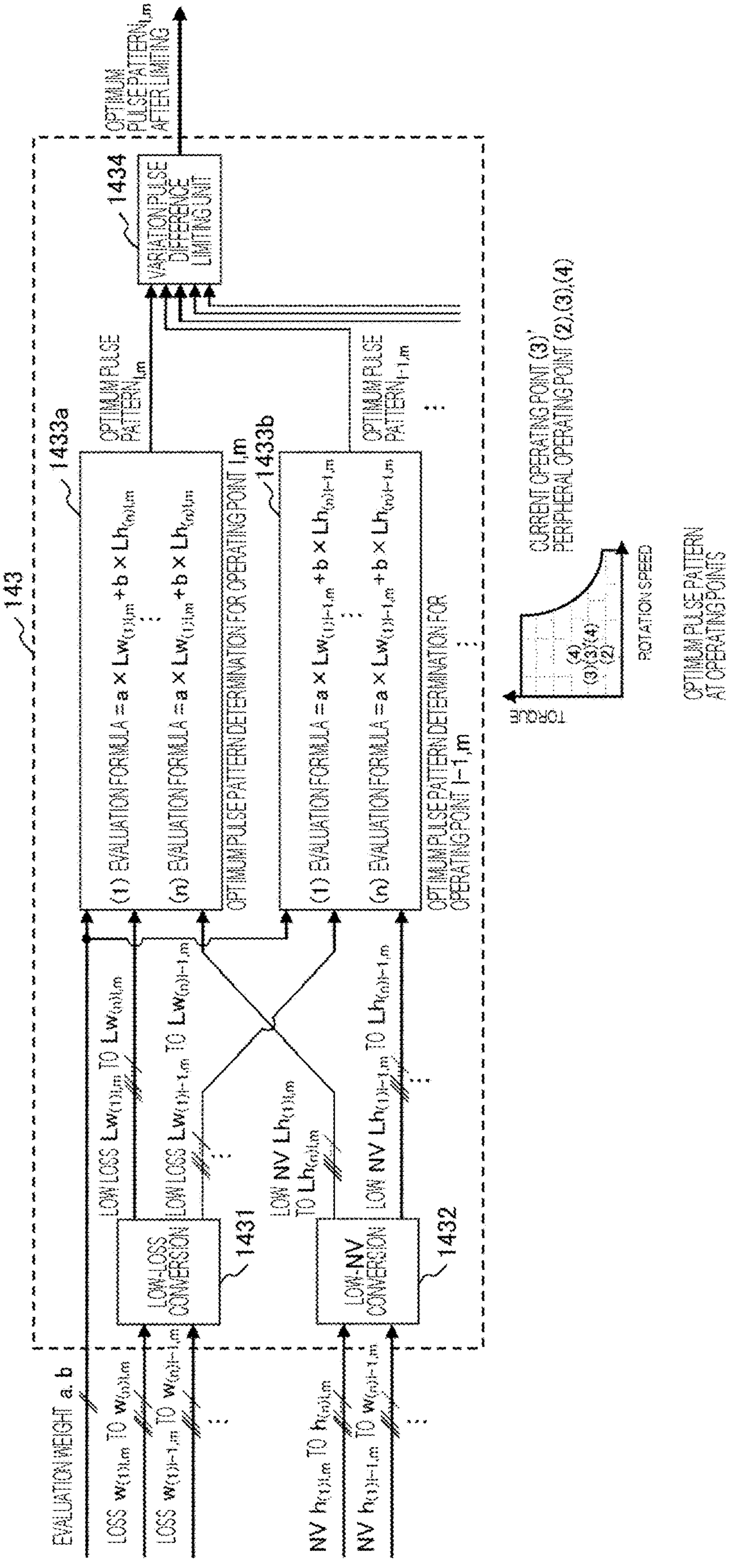
FIG. 7 is a functional block diagram of an optimum pulse pattern determination unit 143 in FIG. 3.

The function of the optimum pulse pattern determination unit 143 will be described with reference to FIG. 7. FIG. 7 is a functional block diagram of the optimum pulse pattern determination unit 143 in FIG. 3.

As illustrated in FIG. 7, the optimum pulse pattern determination unit 143 uses, as inputs, the evaluation weights a and b, the loss/NV of the current operating point (1 row and m columns), and the peripheral operating points (for example, 1-1 rows and m columns), and determines the optimum pulse pattern on the basis of the evaluation formula.

The optimum here means that it is possible to output a pulse pattern that is most appropriate for the surrounding environment and the vehicle state and can meet the low loss and low NV demands of the driver.

The loss w(n) and NV h(n) are converted into low loss Lw(n) and low NV h(n), which are values obtained by normalizing the inverses, by low-loss conversion 1431 and low-NV conversion 1432.

In the optimum pulse pattern determinations 1433*a* to 1433*e* (only a and b are illustrated), the evaluation value is calculated for each pulse pattern on the basis of the evaluation formula for the current operating point and the peripheral operating points, and the optimum pulse pattern having the largest evaluation value is determined.

This evaluation formula is (n) evaluation formula=a×Lw(n)l, m+b×Lh(n)l, m.

Figure 8:
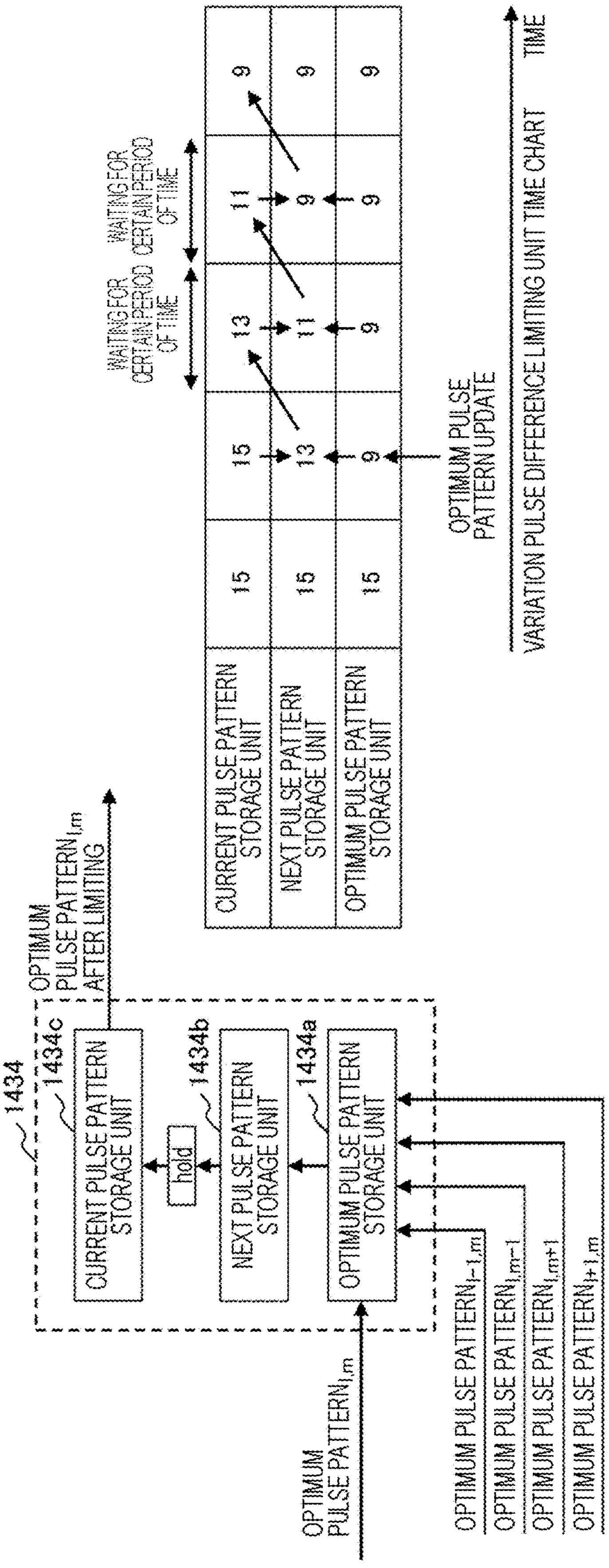
FIG. 8 is a functional block diagram of a variation pulse difference limiting unit 1434 in FIG. 7.

The function of a variation pulse difference limiting unit 1434 in FIG. 8 will be described with reference to FIG. 8. FIG. 8 is a functional block diagram of the variation pulse difference limiting unit 1434 in FIG. 7.

As illustrated in FIG. 8, in the variation pulse difference limiting unit 1434, in order to suppress a noise change due to a rapid change in the number of pulses (switching frequency), the optimum pulse pattern at the current operating point and the peripheral operating points is used as an input.

In a case where the surrounding environment or the vehicle state changes at the current operating point and the optimum pulse pattern is changed, or a case where the operating point changes and transitions to a peripheral operating point, the optimum pulse pattern is stored in an optimum pulse pattern storage unit 1434*a*. In addition, the current pulse pattern is stored in a current pulse pattern storage unit 1434*c*.

Next, in a next pulse pattern storage unit 1434*b*, a value at which a variation pulse difference from the current pulse pattern does not become steep between the pulse patterns stored in the optimum pulse pattern storage unit 1434*a* and the current pulse pattern storage unit 1434*c* (for example, 2 which is the minimum pulse difference that is not even order) is stored in the next pulse pattern storage unit 1434*b*.

Then, by waiting for a certain period of time until updating the current pulse pattern to the next pulse pattern (for example, a period of time of 10 sec for human auditory perception to adapt), a noise change due to a rapid change in the number of pulses is suppressed, and the auditory perception is improved. The right diagram of FIG. 8 illustrates a variation pulse difference limiting unit time chart.

Note that, in the present embodiment, processing is performed in the ride comfort/cost evaluation calculation 1414. However, in a case where an item regarding safety with higher importance in the low loss/low NV evaluation weight determination unit 141 becomes effective, the variation pulse limitation may not be performed.

In addition, in the present embodiment, the variation pulse difference is limited on the assumption of the synchronous PWM, but the carrier or switching frequency difference may be limited on the assumption of the asynchronous PWM.

As described above, the motor control device 1 of the present embodiment includes: a plurality of PWM pulse patterns; the pulse pattern determination unit 14 that sets a pulse pattern for performing PWM control; the evaluation unit (low loss/low NV evaluation weight determination unit 141) that determines a priority of a total loss of an AC motor (permanent magnet synchronous motor 2) and a power converter (inverter 3) and vibration noise of the AC motor (permanent magnet synchronous motor 2); and the loss/NV calculation unit 142 that calculates a value of the total loss and a value of the vibration noise in torque and rotation speed for each pulse pattern. The evaluation unit (low loss/low NV evaluation weight determination unit 141) determines the priority on the basis of a parameter regarding at least one of a surrounding environment, mode designation by intention of a driver, a remaining battery amount, a driving operation point, and a vehicle state, and the pulse pattern determination unit 14 sets the pulse pattern by using the priority determined by the evaluation unit (low loss/low NV evaluation weight determination unit 141), the value of the total loss, and the vibration noise. Note that the above-described parameters are represented as continuous variables.

Accordingly, it is possible to appropriately achieve both low loss and low NV even in a scene where a plurality of surrounding environments and a plurality of vehicle states overlap.

In addition, the evaluation unit (low loss/low NV evaluation weight determination unit 141) has an evaluation formula for determining the priority, and the evaluation formula includes the driver detail priority setting value.

Accordingly, the low loss/low NV weight determination is offset with the driver detail priority setting value, so that it is possible to set the preferred loss/NV specifications of the driver.

In addition, the evaluation formula may include external update information.

By including the external update information, the weight determination of low loss and low NV is offset with the external update information, whereby the product aggregation information such as aging deterioration can be reflected by the OTA.

In addition, the pulse pattern determination unit 14 sets the pulse pattern at the current operating point and the peripheral operating point in the correlation between the torque and the rotation speed of the permanent magnet synchronous motor 2.

The determination of the pulse pattern that optimizes the low loss and the low NV is performed at the current operating point and the peripheral operating point, so that the pulse pattern can be immediately applied at the time of changing the operating point.

In addition, when changing the pulse pattern, the pulse pattern determination unit 14 limits a variation width such that the variation pulse difference, the carrier frequency difference, and the switching frequency difference before and after the change are equal to or less than predetermined values.

The variation pulse difference is limited by changing the pulse pattern that optimizes the low loss and the low NV, so that it is possible to avoid the deterioration of the auditory perception due to the significant change of the frequency.

Second Embodiment

Figure 9:
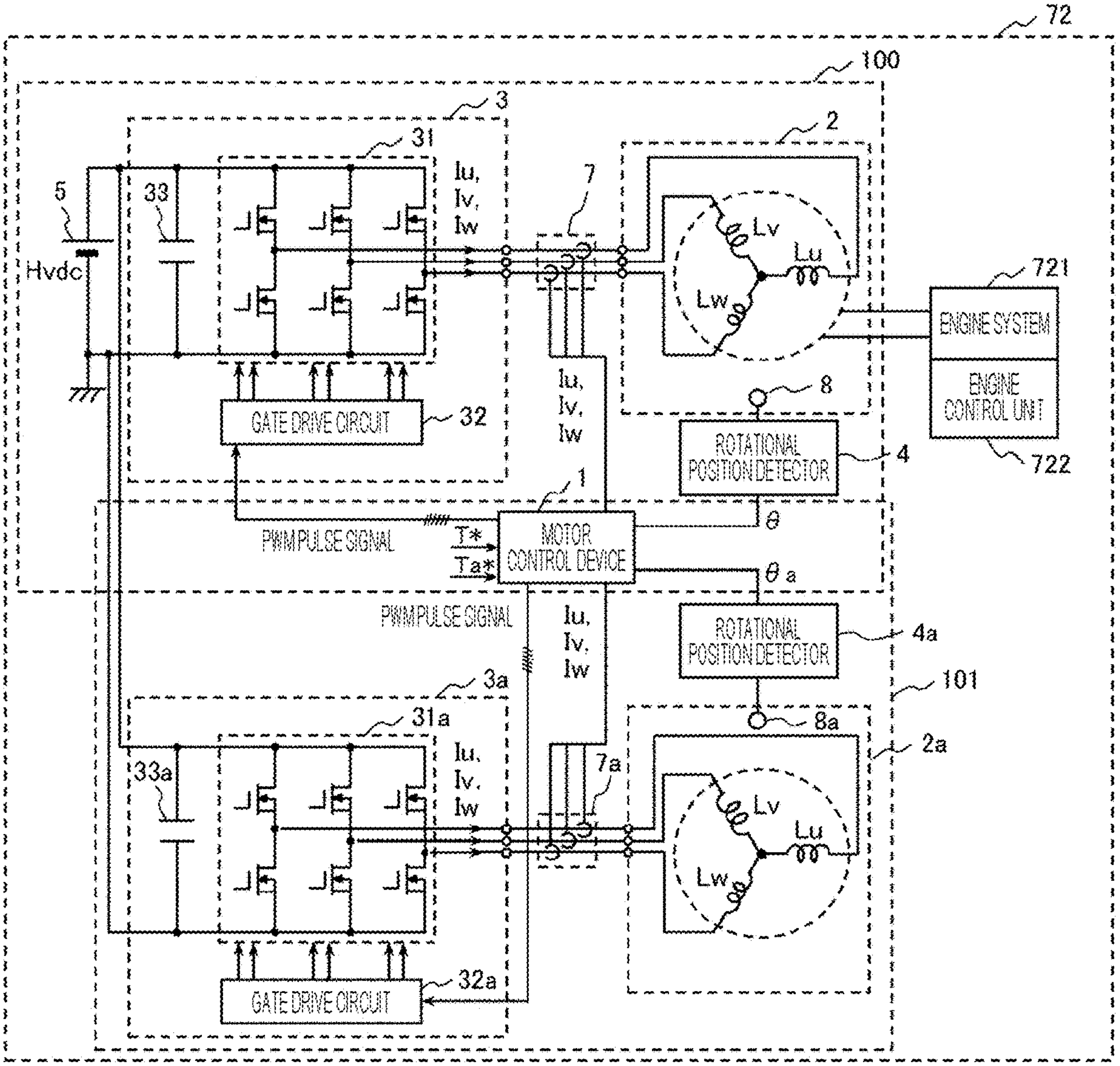
FIG. 9 is a diagram illustrating a schematic configuration of a hybrid system according to a second embodiment of the present invention.

An example in which the motor control device 1 described in the first embodiment is mounted on a hybrid system will be described with reference to FIG. 9. FIG. 9 is a diagram illustrating a schematic configuration of a hybrid system 72 of the present embodiment.

As illustrated in FIG. 9, the hybrid system 72 of the present embodiment includes the motor control device 1, inverters 3 and 3*a* that operate on the basis of the pulse pattern output from the motor control device 1 and perform power conversion from DC power to AC power, permanent magnet synchronous motors 2 and 2*a* that are driven using the inverters 3 and 3*a*, and an engine system 721 that is connected to the permanent magnet synchronous motor 2.

In the present embodiment, the weight determination of low loss and low NV in the hybrid system is performed by an evaluation formula using continuous physical values representing the surrounding environment and the vehicle state.

Accordingly, it is possible to appropriately determine the pulse pattern in a scene in which a plurality of surrounding environments and a plurality of vehicle states overlap and optimize both low loss and low NV.

Third Embodiment

Figure 10:
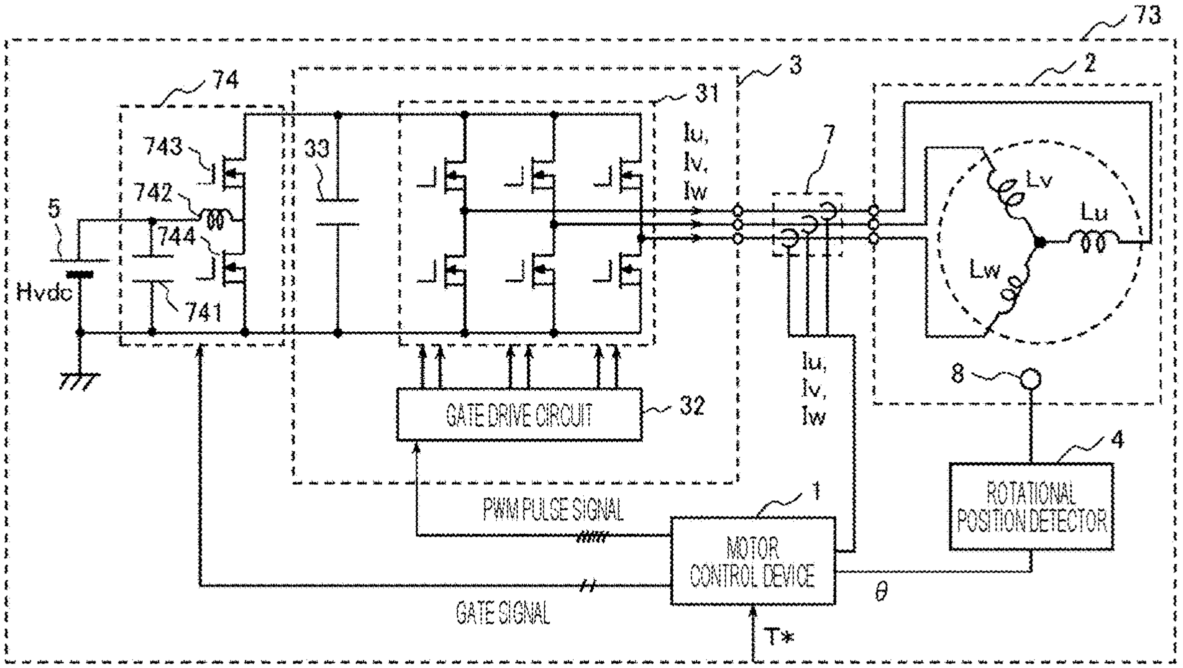
FIG. 10 is a diagram illustrating a schematic configuration of a motor drive system according to a third embodiment of the present invention.

An example in which the motor control device 1 described in the first embodiment is mounted on a boost converter system will be described with reference to FIG. 10. FIG. 10 is a diagram illustrating a schematic configuration of a motor drive system 73 according to the present embodiment.

As illustrated in FIG. 10, the motor drive system 73 of the present embodiment includes the motor control device 1, a boost converter 74 that is connected to the high-voltage battery 5 that is a DC power supply and generates DC power obtained by boosting the DC power supply according to control of the motor control device 1, and a power converter (inverter 3) that operates on the basis of the PWM pulse signal output from the motor control device 1 and performs power conversion from the DC power boosted by the boost converter 74 to AC power.

In the present embodiment, the weight determination of low loss and low NV in the boost converter system is performed by an evaluation formula using continuous physical values representing the surrounding environment and the vehicle state.

Accordingly, it is possible to appropriately determine the pulse pattern in a scene in which a plurality of surrounding environments and a plurality of vehicle states overlap and optimize both low loss and low NV.

Fourth Embodiment

Figure 11:
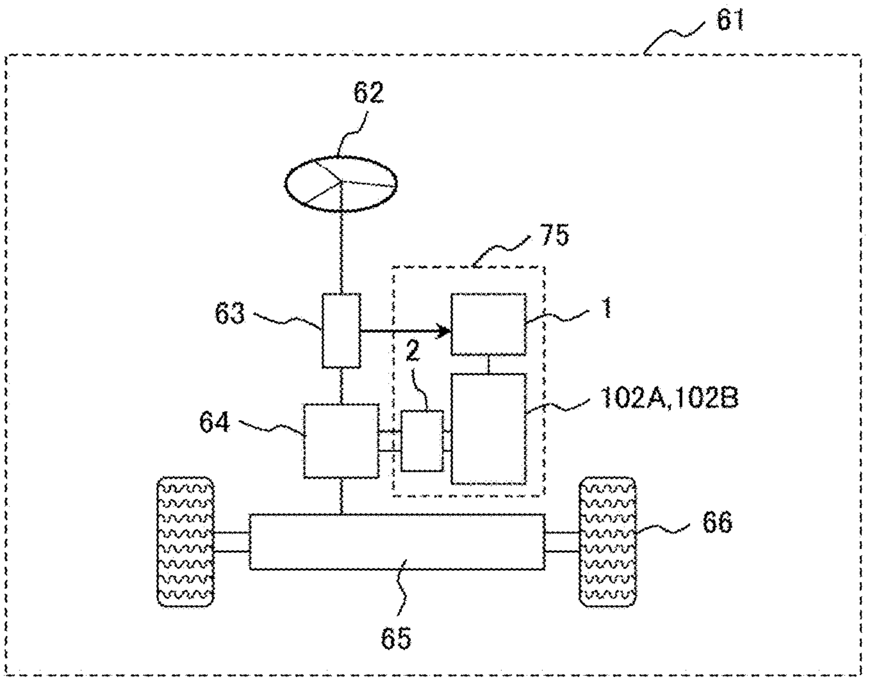
FIG. 11 is a diagram illustrating a schematic configuration of an electric power steering system according to a fourth embodiment of the present invention.

An example in which the motor control device 1 described in the first embodiment is mounted on an electric power steering system will be described with reference to FIG. 11. FIG. 11 is a diagram illustrating a schematic configuration of an electric power steering system 61 according to the present embodiment.

As illustrated in FIG. 11, the electric power steering system 61 of the present embodiment includes the motor control device 1, a plurality of power converters (inverters 102A and 102B) that operate on the basis of the PWM pulse signal output from the motor control device 1 and each perform power conversion from DC power to AC power, and the permanent magnet t synchronous motor 2 that includes a plurality of winding systems and is driven when the AC power generated by the plurality of power converters (inverter 102A and 102B) flows through the plurality of winding systems, respectively. The steering of the vehicle is controlled by using the permanent magnet synchronous motor 2.

In the present embodiment, the weight determination of low loss and low NV in the electric power steering system 61 is performed by an evaluation formula using continuous physical values representing the surrounding environment and the vehicle state.

Accordingly, it is possible to appropriately determine the pulse pattern in a scene in which a plurality of surrounding environments and a plurality of vehicle states overlap and optimize both low loss and low NV.

Fifth Embodiment

Figure 12:
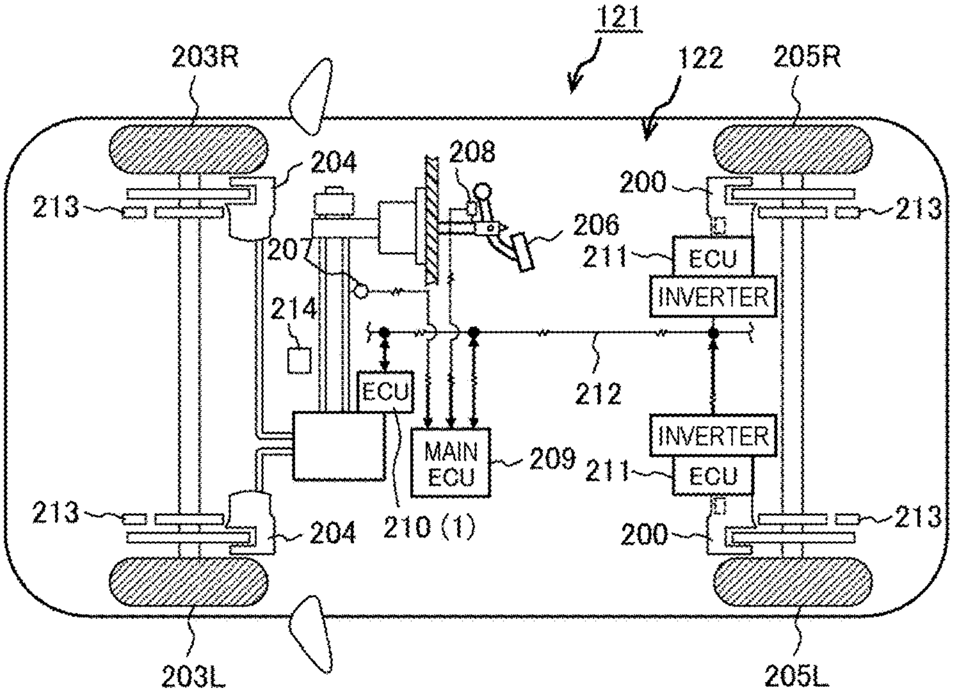
FIG. 12 is a diagram illustrating a schematic configuration of an electric brake system according to a fifth embodiment of the present invention.

An example in which the motor control device 1 described in the first embodiment is mounted on an electric brake system will be described with reference to FIG. 12. FIG. 12 is a diagram illustrating a schematic configuration of the electric brake system of the present embodiment. Note that in FIG. 12, the motor control device 1 is mounted on a brake control ECU 210.

As illustrated in FIG. 12, the electric brake system of the present embodiment includes the motor control device 1, a plurality of inverters that operate on the basis of the PWM pulse signal output from the motor control device 1 and each perform power conversion from DC power to AC power, and an electric brake 200 that has an AC motor driven by flow of the AC power generated by each of the plurality of inverters. The brake of the vehicle 121 is applied by using the AC motor.

In the present embodiment, the weight determination of low loss and low NV in the electric brake system is performed by an evaluation formula using continuous physical values representing the surrounding environment and the vehicle state.

Accordingly, it is possible to appropriately determine the pulse pattern in a scene in which a plurality of surrounding environments and a plurality of vehicle states overlap and optimize both low loss and low NV.

Sixth Embodiment

Figure 13:
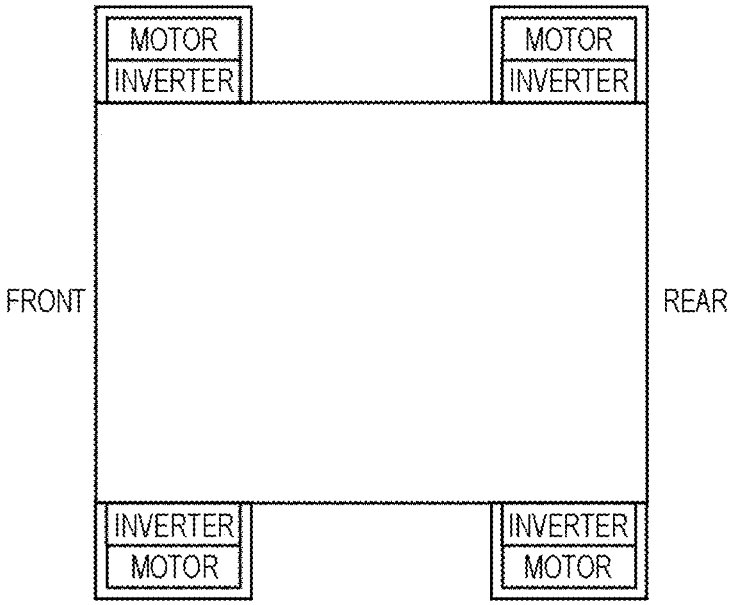
FIG. 13 is a diagram illustrating a schematic configuration of an in-wheel motor system according to a sixth embodiment of the present invention.

An example in which the motor control device 1 described in the first embodiment is mounted on an in-wheel motor system will be described with reference to FIG. 13. FIG. 13 is a diagram illustrating a schematic configuration of the in-wheel motor system of the present embodiment.

The in-wheel motor system of the present embodiment includes the motor control device 1 (not illustrated), a plurality of inverters that operates on the basis of the PWM pulse signal output from the motor control device 1 and performs power conversion from DC power to AC power, and a plurality of AC motors that are driven by the flow of the AC power generated by the inverters.

In the present embodiment, the weight determination of low loss and low NV in the in-wheel motor system is performed by an evaluation formula using continuous physical values representing the surrounding environment and the vehicle state.

Accordingly, it is possible to appropriately determine the pulse pattern in a scene in which a plurality of surrounding environments and a plurality of vehicle states overlap and optimize both low loss and low NV.

Note that the present invention is not limited to the above-described embodiments, and includes various modifications. For example, the above-described embodiments have been described in detail for easy understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment.

REFERENCE SIGNS LIST

1 motor control device
2, **2*a*** permanent magnet synchronous motor
3, **3*a*, 102A, 102**B inverter
4, **4*a*** rotational position detector
5 high-voltage battery
7 current detection unit
8, **8*a*** rotational position sensor
11 current command generation unit
12 speed calculation unit
13 three-phase/dq current conversion unit
14 pulse pattern determination unit
15 current control unit
16 dq/three-phase voltage conversion unit
17 carrier wave frequency adjustment unit
18 zero-phase addition unit
19 carrier wave generation unit
20 PWM control unit
31, **31*a*** DC/AC conversion circuit
32, **32*a*** gate drive circuit
33, **33*a*, 741** capacitor
61 electric power steering system
62 steering wheel
63 torque sensor
64 steering assist mechanism
65 steering mechanism
72 hybrid system
73, 100, 101 motor drive system
74 boost converter
75 steering control mechanism
121 vehicle
122 brake device
141 low loss/low NV evaluation weight determination unit
142 loss/NV calculation unit
143 optimum pulse pattern determination unit
144 pulse pattern information output unit
200 electric brake
203R, 203L front wheel
204 hydraulic brake
205R, 205L rear wheel
206 brake pedal
207 liquid pressure sensor
208 pedal stroke sensor
209 main ECU
210, 211 brake control ECU
212 in-vehicle network
213 wheel speed sensor
214 combine sensor
721 engine system
722 engine control unit
742 coil
743, 744 switching element
1411 mode designation determination
1412 safety determination
1413 other nuisance determination
1414 ride comfort/cost evaluation calculation
1415 evaluation weight selection unit
1431 low-loss conversion
1432 low-NV conversion
1434 variation pulse difference limiting unit
**1434*a*** optimum pulse pattern storage unit
**1434*b*** next pulse pattern storage unit

1434*c* current pulse pattern storage unit

The invention claimed is:

1. A motor control device that is connected to an AC motor and PWM-controls a power converter that performs power conversion from DC power to AC power, the motor control device comprising:

a plurality of PWM pulse patterns;

a pulse pattern determination unit that sets a pulse pattern for performing the PWM control;

an evaluation unit that determines a priority of a total loss of the AC motor and the power converter and vibration noise of the AC motor; and a loss/NV calculation unit that calculates a value of the total loss and a value of the vibration noise in torque and rotation speed for each pulse pattern, wherein the evaluation unit determines the priority on a basis of a parameter regarding at least one of a surrounding environment, mode designation by intention of a driver, a remaining battery amount, a driving operation point, and a vehicle state, and the pulse pattern determination unit sets the pulse pattern by using the priority determined by the evaluation unit, the value of the total loss, and the vibration noise.

2. The motor control device according to claim 1, wherein the parameter is expressed as a continuous variable.

3. The motor control device according to claim 1, wherein the evaluation unit has an evaluation formula for determining the priority, and the evaluation unit includes a driver detail priority setting value.

4. The motor control device according to claim 1, wherein the evaluation unit has an evaluation formula for determining the priority, and the evaluation formula includes external update information.

5. The motor control device according to claim 1, wherein the pulse pattern determination unit sets the pulse pattern at a current operating point and a peripheral operating point in a correlation between the torque and the rotation speed.

6. The motor control device according to claim 1, wherein when changing the pulse pattern, the pulse pattern determination unit limits a variation width such that a variation pulse difference, a carrier frequency difference, and a switching frequency difference before and after the change are equal to or less than predetermined values.

7. The motor control device according to claim 1, wherein the motor control device is mounted on any of a hybrid system, a boost converter system, an electric power steering system, an electric brake system, and an in-wheel motor system.

8. A motor control method for PWM-controlling an AC motor, the method comprising:

(a) a step of determining a priority of a total loss of the AC motor and a power converter that drives the AC motor, and vibration noise of the AC motor;

(b) a step of determining the priority on a basis of a parameter regarding at least one of a surrounding environment, mode designation by intention of a driver, a remaining battery amount, a driving operation point, and a vehicle state; and (c) a step of setting a pulse pattern by using the priority determined in the step (b), a value of the total loss, and the vibration noise.

9. The motor control method according to claim 8, wherein the parameter is expressed as a continuous variable.

10. The motor control method according to claim 8, wherein in the step (a), the priority is determined by using an evaluation formula including a driver detail priority setting value.

11. The motor control method according to claim 8, wherein in the step (a), the priority is determined by using an evaluation formula including external update information.

12. The motor control method according to claim 8, wherein in the step (b), the pulse pattern at a current operating point and a peripheral operating point is determined in a correlation between torque and rotation speed of the AC motor.

13. The motor control method according to claim 8, wherein in the step (c), when changing the pulse pattern, a variation width is limited such that a variation pulse difference, a carrier frequency difference, and a switching frequency difference before and after the change are equal to or less than predetermined values.

14. The motor control method according to claim 8, wherein the motor control method is used to control any of a hybrid system, a boost converter system, an electric power steering system, an electric brake system, and an in-wheel motor system.

* * * * *